(No Model.)
J. B. MANCHESTER.
PROCESS OF MAKING LEAD TRAPS.
No. 585,446. Patented June 29, 1897.
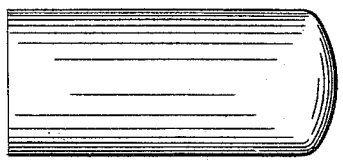
FIG. 7.
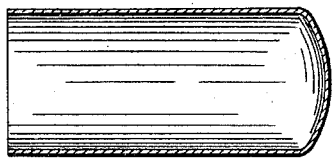
FIG. 8.
FIG. 1.
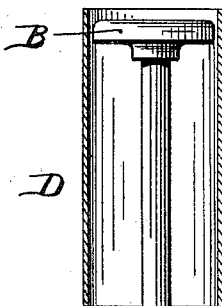
FIG. 2.
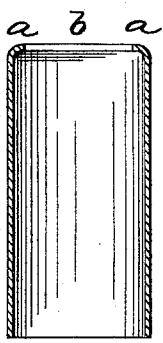
FIG. 3.
FIG. 4.
FIG. 5.
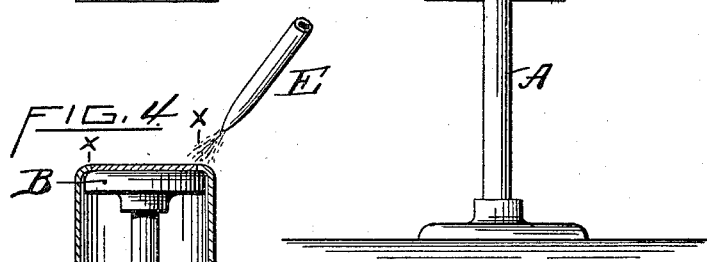
FIG. 6.
WITNESSES
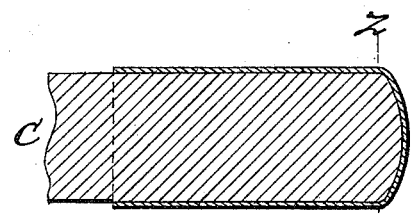
INVENTOR
James B. Manchester
By Warren R. Perce
Atty.
THE NORRIS PETERS CO., PHOTO-LITHO., WASHINGTON, D. C.

UNITED STATES PATENT OFFICE.

JAMES B. MANCHESTER, OF PROVIDENCE, RHODE ISLAND.

PROCESS OF MAKING LEAD TRAPS.

SPECIFICATION forming part of Letters Patent No. 585,446, dated June 29, 1897.

Application filed April 1, 1897. Serial No. 630,286. (No model.)

*To all whom it may concern:*

Be it known that I, JAMES B. MANCHESTER, of the city and county of Providence, in the State of Rhode Island, have invented a certain new and useful Improvement in Processes of Making Lead Traps; and I declare the following to be a specification thereof, reference being had to the accompanying drawings.

Figure 1 is a side elevation of a section of lead pipe from which the trap is to be made. Fig. 2 shows in side elevation the stand and disk upon which the trap is made, together with said section of lead pipe in position thereon before the upper edge of the pipe has been bent. Fig. 3 shows the lead pipe in central longitudinal section after the first operation has been completed. Fig. 4 shows the second operation, the stand and disk being shown in elevation and the lead trap in central longitudinal section. Fig. 5 shows the result of the second operation, the trap being illustrated in central longitudinal section. Fig. 6 shows the third operation of my improved process. Fig. 7 is a side elevation of the lead trap made by my said process. Fig. 8 is a central longitudinal section of the same.

Like letters indicate like parts.

My invention is an improved process of making lead traps; and it consists in the use of a stand having at its top a circular disk mounted thereon, on which disk a section of lead pipe is placed and its edge bent over to form a slight annular flange extending inwardly over the edges of said disk, then heating said disk and flowing melted lead upon the top of the heated disk to the edge of the circular flange and uniting the same thereto by a suitable flux, and then spinning said closed tube thus formed upon an arbor to shape the end of the trap, as hereinafter particularly described.

I use a stand or standard A, adapted to rest upon a bench or proper support. Upon said stand is a metallic disk B of circular shape. I also use a lathe of usual construction, having a revolving arbor C thereon.

From a lead pipe of proper diameter I cut a section D, with square ends, as shown in Fig. 1, and place said section upon the stand with the upper edge thereof projecting slightly above the top of the disk B. Said disk, as seen in Fig. 2, has a rounded edge on the top. By means of a wooden mallet the upper edge of the section D of lead pipe is pounded down and bent over to form an inward annular flange $a$, leaving a large central opening $b$.

The next operation is to heat the disk B and then to place thereon the flanged section above described. The edge of the flange $a$ is covered with grease for a flux, and by means of a blowpipe E a flame of gas is directed upon a stick or piece of lead, which under the heat of the blowpipe is melted down and flows over the top surface of the heated disk B until the entire space between the edge of the flange all around is flooded with the melted lead. The blowpipe melts down the edge of the flange and flows it and the central mass of melted lead together, as shown in Fig. 4, thus forming a welded joint between the lead of the pipe and the lead bottom thus inserted. The result of this operation is shown in Fig. 5, in which it is seen that the closed end of the trap thus formed is square at a right angle with the sides of the trap, having, however, a slightly-rounded edge. The lines $x\,x$ in Fig. 4 indicate the place of the welding of the joint.

The last operation is to take the trap shown in Fig. 5 and place it on the revolving arbor C of a lathe, as seen in Fig. 6. Said arbor has a rounded end, as there shown. By means of a spinning-tool the square end of the trap is spun down to fit upon the end of the arbor. This gives the trap the proper shape and finish, and also brings the joint from the position shown at $x\,x$ in Fig. 4 to the position indicated by the dotted line $z\,z$ in Fig. 6.

The finished trap so made is shown in elevation in Fig. 7 and in central longitudinal section in Fig. 8.

The bottom of the trap may be made of any desired thickness and has as great strength as if it were integral with the sides.

The space between the edge of the flange, round about, and the top of the disk B thus constitutes a mold or matrix, into which the melted lead is poured and flowed. The bottom of this mold is the heated disk. If the disk were not heated, the melted lead would be chilled in the portion which is in contact therewith and "cold-shuts," "blow-holes,"

or pits would be formed in it, thus making the trap-bottom defective and unequal in density throughout its extent. The heating of the disk facilitates the flow of the melted lead and causes it to be of uniform density and free from defects.

I claim as a novel and useful invention and desire to secure by Letters Patent—

The improved process of making lead traps herein described, consisting in placing a section of a lead pipe upon a stand and disk and bending the upper edge of said pipe over the disk to form an inward annular flange, then heating said disk and placing thereon said flanged pipe, then covering the edge of the flange with a suitable flux, then flowing melted lead upon the top of said heated disk and filling therewith the entire space between the edge of the flange, round about and melting said edge into the mass of lead thus filled in, and then finishing said inserted bottom, thus formed, after the cooling thereof, upon a revolving arbor to shape said closed end, substantially as specified.

JAMES B. MANCHESTER.

Witnesses:
WARREN R. PERCE,
DANIEL W. FINK.